Figure 1:
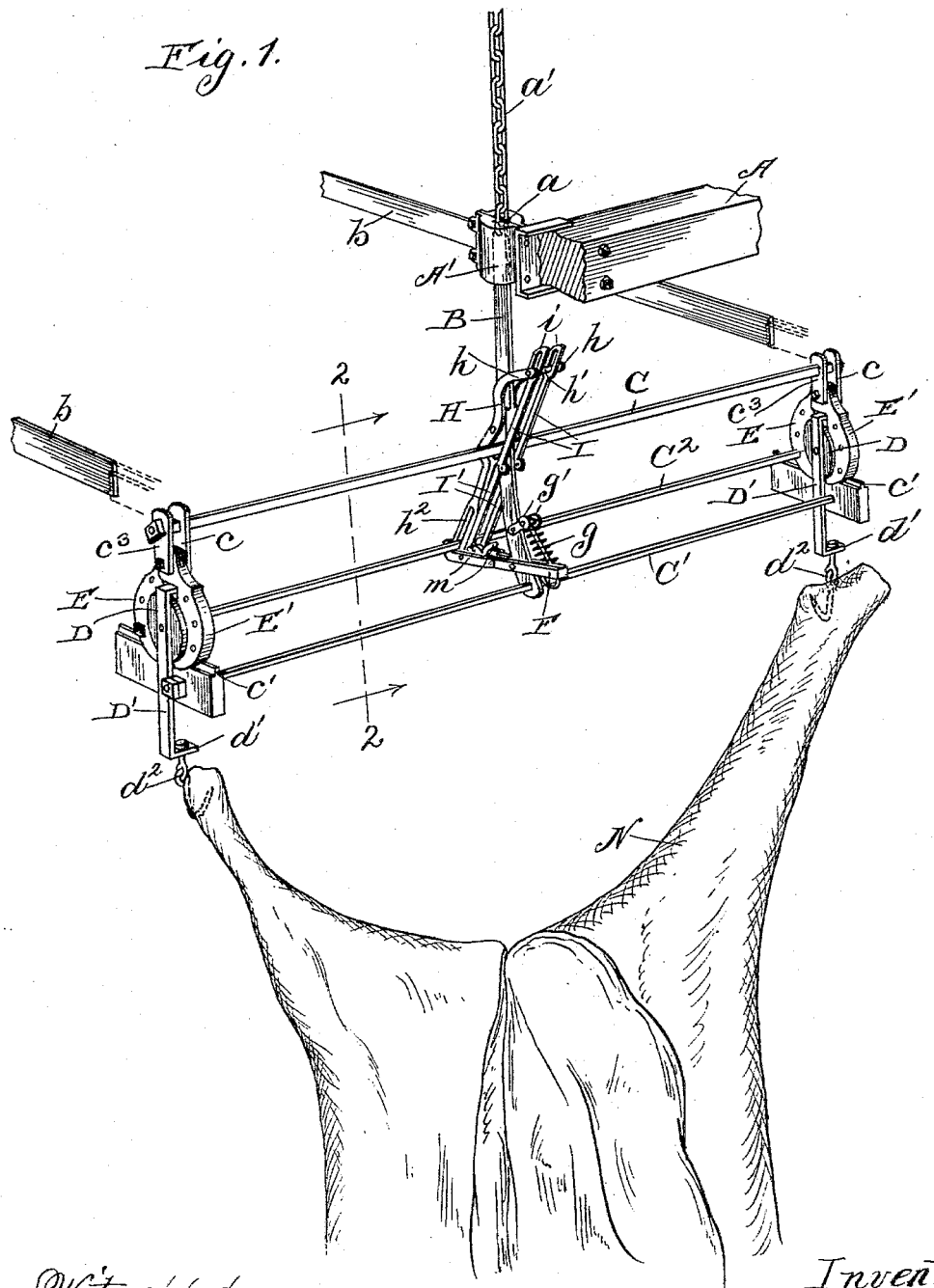

(No Model.) 2 Sheets—Sheet 1.

J. LEVINSON & B. ROSENBERG.
CONVEYING APPARATUS FOR SLAUGHTERED ANIMALS.

No. 597,853. Patented Jan. 25, 1898.

Witnesses:
W. J. Jacker.
E. A. Duggan.

Inventors
Julius Levinson
and
Barney Rosenberg.
By Chas. C. Tillman, Atty.

(No Model.) 2 Sheets—Sheet 2.
J. LEVINSON & B. ROSENBERG.
CONVEYING APPARATUS FOR SLAUGHTERED ANIMALS.
No. 597,853. Patented Jan. 25, 1898.
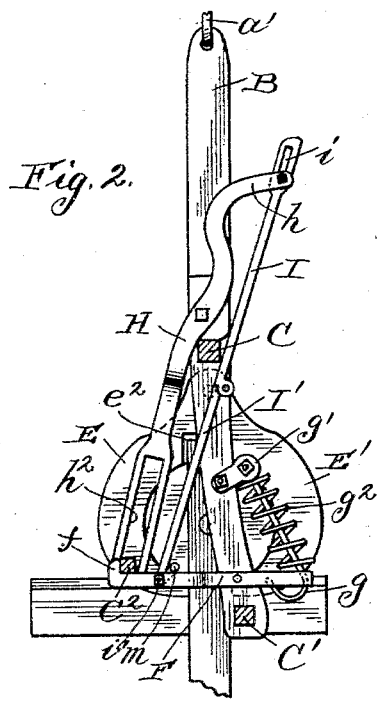
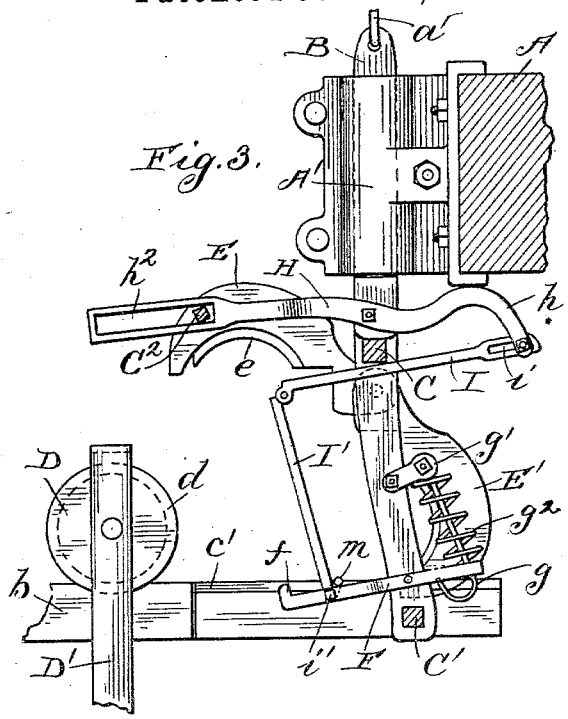
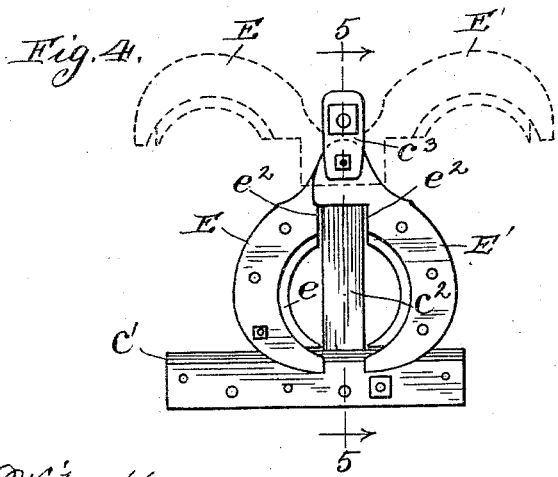
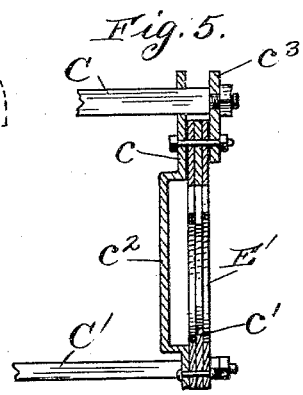
Witnesses:
W. J. Jaeker,
E. A. Duggan.
Inventors:
Julius Levinson and
Barney Rosenberg.
By Chas. C. Tillman, Atty.

UNITED STATES PATENT OFFICE.

JULIUS LEVINSON AND BARNEY ROSENBERG, OF CHICAGO, ILLINOIS.

CONVEYING APPARATUS FOR SLAUGHTERED ANIMALS.

SPECIFICATION forming part of Letters Patent No. 597,853, dated January 25, 1898.

Application filed January 25, 1897. Serial No. 620,584. (No model.)

*To all whom it may concern:*

Be it known that we, JULIUS LEVINSON, a citizen of the United States, and BARNEY ROSENBERG, a subject of the Czar of Russia, both residing at Chicago, in the county of Cook and State of Illinois, have invented certain new and useful Improvements in Conveying Apparatus for Slaughtered Animals, of which the following is a specification.

This invention relates to improvements in a hanger or conveying device, and while it is more especially adapted and intended to be used in large slaughtering-houses and for raising and causing to be sent off on a track the bodies of bullocks after they have been skinned and dressed, yet it may be used in other places and for moving the bodies of other kinds of animals after they have been slaughtered; and it consists in certain peculiarities of the construction, novel arrangement, and operation of the various parts thereof, as will be hereinafter more fully set forth and specifically claimed.

The main objects of our invention are, first, to provide a device which may be readily attached to the legs of the slaughtered bullock while in a lowered position, after which it and the bullock may be quickly raised to the proper position to allow the traveling hooks engaging the bullock's legs to be moved onto a suitable track or rails, and, second, such a device the parts of which are so constructed and arranged that the rollers of the traveling hooks may be easily inserted between the retaining-jaws therefor and automatically released therefrom in the raising or upward movement of the device.

Other objects and advantages will appear in the description and statement of operation hereinafter contained.

In order to enable others skilled in the art to which our invention pertains to make and use the same, we will now proceed to describe it, referring to the accompanying drawings, in which—

Figure 1 is a perspective view of our device, showing a portion of the body of a bullock suspended thereon, a part of the supporting-beam and track, and illustrating the device in the act of being raised to the position indicated by dotted lines. Fig. 2 is a cross-sectional view taken on line 2 2 of Fig. 1, showing one of the rollers and a part of its hook secured in position by means of the retaining-jaws and illustrating the mechanism in its normal position, but detached from the supporting-beam. Fig. 3 is an enlarged view, partly in section and partly in elevation, taken on line 2 2 of Fig. 1, but showing the mechanism in a position to release the roller and illustrating one of the rollers as having been removed from the jaws and resting on one of the rails of the track. Fig. 4 is an end view in elevation of one pair of the retaining-jaws and its movable rail, showing by dotted lines the position to which said jaws may be raised; and Fig. 5 is a vertical sectional view, partly in elevation, taken on line 5 5 of Fig. 4.

Similar letters refer to like parts throughout the different views of the drawings.

A represents a supporting-beam, on one side of which is secured a guide-block or casting A', having a vertical opening $a$, through which may pass the standard B and a chain $a'$ or other suitable suspending device, which is connected at one of its ends to the upright standard B and at its other end to a mechanism (not shown) used for raising and lowering our apparatus. Just below the beam A is located a track composed of rails $b$, which are parallel with one another and may be slightly inclined and leading into a cooling-room or other suitable place. Extending through or secured to the standard B about its middle is a horizontal bar or rod C, on each end of which is secured a depending arm $c$, to the lower end of each of which is secured a short rail-section $c'$, on which the rollers which carry the hooks rest and operate, as will be presently explained.

Secured to the lower portion of the standard B is a tie-rod C', which passes through the rail-sections $c'$ near their ends and serves to secure them together, as well as to aid in preventing them turning on their fastenings, which connects them to the arms $c$. As shown in Fig. 5, each of the arms are formed with an offset $c^2$ to prevent them interfering with the rollers D, which are preferably formed with grooves $d$ on their peripheries to receive the rails $b$ and $c'$, as well as the annular extensions $e$ on the inner portion of the retaining-jaws E and E', which are pivotally secured between the arms $c$ and $c^3$, the latternamed arms being also secured on the horizontal bar or rod C, as shown in Fig. 1 of the drawings. The jaws E are united by means of a rod or bar C², which extends in front of the lower part of the upright standard B and allows said jaws to be raised simultaneously. Pivotally secured astride of the lower portion of the upright standard B is a forked lever F, having on its front ends hooks $f$ to normally engage the rod or bar C², and thus secure the jaws E in position to retain the rollers D in place. Passing through the outer or rear end of the lever F is a rod $g$, which is pivotally secured at its upper end to lugs $g'$ on the standard. Around this rod is a spiral spring $g^2$, whose ends rest against the outer end of the lever F and lugs $g'$, respectively. Fulcrumed on the standard B, and usually just above the rod or bar C, is a lever H, whose upper portion is formed or provided with cam-shaped forks or prongs $h$, which stride the standard B, as shown, and are united at their ends by means of a bolt $h'$, which operates in the slots $i$ in the upper ends of the elbow-rods I, whose other ends are hinged to the rods I', the lower ends of which are pivotally secured on the lever F near its hooked ends. The lower portion of the lever H is provided with a slot $h^2$, through which passes the rod C², which unites the retaining-jaws E, as before stated. Secured on the pin or bolt $i'$, which secures the rods I' to the lever F, is a piece whose forks $m$ rest on the upper surface of said lever and act as a check or stop to the rods I' and cause them to bend at their hinged connection with the rods I or their elbow-joints. Each of the rollers D is journaled in the upper portion of a bracket D', which portion for this purpose is bent back upon itself, as shown in Fig. 1 of the drawings. The lower end of each of the brackets D' is formed with an arm $d'$, located beneath the roller, in which is swiveled a hook $d^2$ to engage the legs of the bullock N or other animal.

While we have shown the levers F and H as being bifurcated, and also illustrated rods I and I' on each side of the standard, and prefer to so construct the device on account of attaining greater strength, yet it is apparent that levers of a different form or construction may be employed and rods on one side only of the standard be used.

It will be observed that the retaining-jaws E and E' are formed in their upper portions with recesses $e^2$ to receive the upper portions of the brackets D', when the rollers are in position between the said jaws.

The operation of our invention is simple and as follows: The device may be lowered until the rails $c'$, which it carries, rest on the ground or floor, when the jaws E' at each end of the implement may be raised by means of the hand and the rollers placed on the rails $c'$, so that the brackets D' will rest against the tie-rod C', thus preventing the rearward movement thereof. The hooks may then be fastened in the legs of the animal and power applied to the chain $a'$, which will cause the device to be raised until the upper beveled ends of the rods I strike against the lower portion of the block A', which will force said rods and the lever F downward, thus releasing the hooks $f$ on said lever from the bar or rod C², which will be raised and carry with it the jaws E by reason of the action of the cam-shaped forks $h$, contacting with the guide-block or its equivalent. When the parts shall have been thus raised, the rails $c'$ will be in alinement with the rails $b$ of the track on which the rollers may be trundled and the bullock moved to the desired place, after which the device may again be lowered and the same operation repeated.

Having thus fully described our invention, what we claim as new, and desire to secure by Letters Patent, is—

1. The combination with a suspensible frame carrying at each of its ends a rail-section, of a pair of retaining-jaws pivotally secured above each of said sections, a mechanism to raise the device, and means to lift one of said jaws at each end of the frame simultaneously, substantially as described.

2. The combination with a suspensible frame carrying at each of its ends a rail-section, of a pair of retaining-jaws pivotally secured above each of said sections on the frame, and a mechanism to raise the device and automatically lift one of said jaws at each end of the frame simultaneously, by reason of the upward movement of the device, substantially as described.

3. The combination of a frame having about its middle an upright standard and carrying at each of its ends a rail-section, with a pair of retaining-jaws pivotally secured on said frame above each of the said sections, a guide-block for the standard secured on a support above the frame, and a mechanism to raise the device and lift one of the jaws at each end of the frame simultaneously, substantially as described.

4. The combination with a frame having about its middle an upright standard and carrying at each of its ends a rail-section, of a pair of retaining-jaws pivotally secured above each of said sections, a rod uniting the corresponding jaws at each end of the frame, a spring-actuated lever fulcrumed on the standard and adapted to normally engage said rod, another lever engaging at one of its ends said rod, and having its other end formed and located so as to strike an obstruction in the upward movement of the frame and means to raise and guide the device and to release the first-named lever from the rod, substantially as described.

5. The combination with the guide-block A', having the opening $a$, and secured to a support, of the standard B, the rods C, and C', secured on said standard, the rails $c'$, at the ends of the rod C', and the jaws E, and E', pivotally secured in pairs above said rails, the rod C², connecting the jaws E, the spring-actuated lever F, fulcrumed on the lower part of the standard and having the projections $f$, to engage the rod $c^2$, the lever H, engaging at its lower end the rod C², and formed cam-shaped at its upper end, a jointed rod movably connected to the upper end of the lever H, and pivotally secured at its other end to the lever F, the rollers D, each carrying a hook and adapted to be placed on the rails $c'$, between the jaws, and a mechanism to raise and lower the device, substantially as described.

JULIUS $\overset{\text{his}}{\times}$ LEVINSON.
$\phantom{JULIUS\ }\underset{\text{mark}}{}$
BARNEY ROSENBERG.

Witnesses:
CHAS. C. TILLMAN,
E. A. DUGGAN.